(12) United States Patent
Putnam et al.

(10) Patent No.: US 8,252,414 B2
(45) Date of Patent: Aug. 28, 2012

(54) POLYMER PARTICLES WITH ADDITIVES ENCAPSULATED IN MICROVOIDS

(75) Inventors: David D. Putnam, Fairport, NY (US); Mridula Nair, Penfield, NY (US); Mary C. Brick, Webster, NY (US); Tamara K. Jones, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 566 days.

(21) Appl. No.: 12/505,757

(22) Filed: Jul. 20, 2009

(65) Prior Publication Data

US 2010/0021838 A1  Jan. 28, 2010

Related U.S. Application Data

(60) Provisional application No. 61/083,344, filed on Jul. 24, 2008.

(51) Int. Cl.
   *B32B 5/16* (2006.01)
(52) U.S. Cl. .................................. 428/402; 428/402.24
(58) Field of Classification Search .................. 428/402, 428/402.24
   See application file for complete search history.

(56) References Cited

U.S. PATENT DOCUMENTS

| 3,923,704 A | 12/1975 | Gunning et al. |
| 4,254,201 A | 3/1981 | Sawai et al. |
| 4,339,237 A | 7/1982 | Wang et al. |
| 4,461,849 A | 7/1984 | Karickhoff |
| 4,489,174 A | 12/1984 | Karickhoff |
| 4,833,060 A | 5/1989 | Nair et al. |
| 4,965,131 A | 10/1990 | Nair et al. |
| 6,544,705 B2 | 4/2003 | Kim et al. |
| 6,682,866 B2 | 1/2004 | Sugiyama et al. |
| 6,800,412 B2 | 10/2004 | Sugiyama et al. |
| 2003/0007990 A1 | 1/2003 | Blankenship et al. |
| 2004/0161687 A1 | 8/2004 | Kim et al. |
| 2005/0026064 A1 | 2/2005 | Sugiura et al. |
| 2009/0098382 A1* | 4/2009 | Massa et al. ............. 428/402.24 |

FOREIGN PATENT DOCUMENTS

| EP | 0 083 188 | 7/1983 |
| JP | 01 167846 A | 7/1989 |
| JP | 01 169463 A | 7/1989 |
| JP | 2006 241226 A | 9/2006 |
| WO | WO 2007/075941 A1 | 7/2007 |

* cited by examiner

*Primary Examiner* — Hoa V Le
(74) *Attorney, Agent, or Firm* — Andrew J. Anderson (57) ABSTRACT

Porous particles comprising a polymer binder and at least one additive distinct from any pore stabilizing compound present in the particle, wherein: the polymer binder comprises a solid compositionally continuous phase having an external particle surface; discrete pores are dispersed within the solid compositionally continuous phase, forming internal pore surfaces; and the at least one additive is present primarily in the discrete pores. The additive may further preferably not be present in the solid compositionally continuous phase, and be substantially absent from the external particle surface. A toner set for forming a color electrophotographic image comprising a plurality of different colored toners, where at least one of the different colored toners comprise such porous particles comprising additives, and in a particular embodiment wherein at least two different colored toners each comprise different pigments present primarily in the internal pores. A process of making such porous particles.

20 Claims, 4 Drawing Sheets

POLYMER PARTICLES WITH ADDITIVES ENCAPSULATED IN MICROVOIDS

CROSS-REFERENCE TO RELATED APPLICATIONS

This application claims the benefit of U.S. Provisional Patent Application No. 61/083,344, filed Jul. 24, 2008, which is incorporated herein by reference in its entirety.

FIELD OF THE INVENTION

This invention relates to novel porous particles having an additive present primarily in internal pores.

BACKGROUND OF THE INVENTION

Electrophotographic images are typically produced by first uniformly charging a primary imaging member such as a photoconducting web or drum using known means such as a corona or roller charger. An electrostatic latent image is then formed by image-wise exposing the primary imaging member using known means such as optical exposure, laser scanners, or LED arrays. The electrostatic latent image is then rendered into a visible image by bringing the electrostatic latent image into close proximity to marking particles, alternatively referred to as toner particles, which have been electrically charged so that they will be attracted to the regions of the primary imaging member bearing the electrostatic latent image. Charging the marking particles, which may or may not comprise a colorant such as a dye or a pigment, and bringing the particles into close proximity with the primary imaging member, is generally accomplished using a magnetic brush development station. The marking particles are first rendered suitable for use in a magnetic brush development station by mixing the marking particles with so-called carrier particles. The carrier particles comprise suitable material that will be attracted to the magnets in the magnetic brush development station and may comprise known materials such as ferrites or iron oxides, etc. The carrier particles often comprise various charge agents that impart a controlled charge on the marking particles. The marking particles may also comprise suitable charge control agents so that, upon mixing with the carrier particles, the marking particles obtain an electrical charge of suitable magnitude and sign so as to make them attractive in the proper amounts to the electrostatic latent image in suitable quantities to enable various image densities to be developed in the electrostatic latent image.

In magnetic brush development, toner particles are generally mixed in the sump of the magnetic brush development station with carrier particles to a predetermined level that is measured with a toner concentration monitor. The marking particles are charged by contacting the carrier particles and brought into close proximity to the primary imaging member bearing the electrostatic latent image by rotating the cylindrical shell, the coaxial magnetic core, or both of the magnetic brush development station. The brush is electrically biased in such a manner that, depending on the sign of the charge of the toner particles, the marking particles can be deposited onto the primary imaging member in either the electrically charged or the electrically discharged regions to render the electrostatic latent image visible.

The toned image is next transferred to a receiver, which could be either a final receiver material such as paper, transparency, etc. or to an intermediate transfer member, such as a compliant intermediate transfer member, and then from the intermediate transfer member to the final receiver member. Transfer can be accomplished by applying pressure between the receiver and either the primary imaging member or the intermediate transfer member. More commonly, pressure is applied in conjunction with either an applied electrostatic field or with heat that softens the toner particles. The image is then typically permanently fixed to the final receiver member using pressure, heat, or solvent vapors. In general it is preferred to heat the marking particles to a temperature that exceeds the glass transition temperature of the marking particles so as to render them fluid. Most commonly, the image is fixed to the final receiver by pressing the image-bearing final receiver member against a heated fuser roller. To prevent the final receiver member from adhering to the heated fuser roller, the heated fuser roller is conventionally first coated with a release agent such as a silicone oil. Alternatively, release agents, and in particular wax particles, may be incorporated into toner particles to facilitate release of a fused toner image from the heated fuser roller.

In such systems, it is important that marking particles be electrically insulating when used in conjunction with magnetic brush development and electrostatic transfer. If the particles are not electrically insulating, their charges can change when in contact with the receiver or in the development station. This could impair transfer and development as the applied electrostatic force used to urge the marking particles towards the primary imaging member or to or from a receiver member would vary with the charge on the marking particles. Moreover, even if the charge did not reverse sign or become so significantly altered so as to prevent development or transfer, the control of either or both of these operations could be impeded, resulting in incorrect amounts of marking particles being deposited, with corresponding undesirable density variations and other artifacts occurring.

Conventional electrostatographic toner powders are made up of a binder polymer and other functional additive ingredients, such as pigment and a charge control agent, that are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrophotographic developer compositions; their low melt elasticity increases the off-set of toner to the hot fuser rollers of the electrophotographic copying apparatus, and the glass transition temperature (Tg) of the binder polymer is difficult to control. In addition, grinding of the polymer results in a wide particle size distribution. Consequently, the yield of useful toner is lower and manufacturing cost is higher. Also the toner fines accumulate in the developer station of the copying apparatus and adversely affect the developer life.

The preparation of toner polymer powders from a preformed binder polymer by the chemically prepared toner process such as the "Evaporative Limited Coalescence" (ELC) offers many advantages over the conventional grinding method of producing toner particles. In this process, polymer particles having a narrow size distribution (coefficients of variation for particle size (ratio of the standard deviation to the average diameter) are normally in the range of about 15 to 35% or less) are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060; 4,965,131; 6,544,705; 6,682,866; and 6,800,412; and US Patent Publication No. 2004/0161687, incorporated herein by reference for all that they contain. This technique generally includes the following steps: mixing a polymer material and a solvent (and optionally additionally one or more of a colorant, a charge control agent, and a wax) to form an organic phase; dispersing the organic phase in an aqueous phase comprising a particulate stabilizer and homogenizing the mixture; evaporating the solvent and washing and drying the resultant product.

Performance of electrostatographic toner particles can be impacted by the presence of additives incorporated into the particles, such as colorants, since a portion of the additives tend to reside on the outer surface of the toner, whether prepared by conventional melt pulverization or chemically prepared processes. The triboelectric charging and electrophotographic performance is then influenced by the additives, which may result in distinct toner properties for each toner of a toner set comprising different additives. Typically, incorporated colorants, and other marking particle additives, if electrically conducting or triboactive, such as carbon black, must be totally encased by the polymer that is used to form the marking particles or surface modified in some way. Failure to do so could result in the possibility of an electrically conducting path that would allow the conducting portions of the colorants to contact components of the development station or receiver sheet and thereby alter the charge of the marking particles. Further even if not electrically conducting, additives such as wax particles may have other detrimental effects if present in substantial amounts on the marking particle surface, such as handling and flow properties of the particles. This requirement for effective encasing of such additives can require relatively large quantities of binder polymer for each marking particle relative to the incorporated colorant or other additives, and is undesirable.

Relatively smaller marking particles having reduced mass and relatively high additive loading would be more economically desirable since the amount of toner required to reach aim image density would be reduced. This reduced toner laydown would in turn advantageously reduce required fusing energy and enable high quality printing applications.

The use of porous toner particles in the electrophotographic process can potentially also reduce the toner mass in the image area by allowing for the encapsulation of a high concentration of toner additives in the pores. Simplistically, a toner particle with 50% porosity should require only half as much mass to accomplish the same imaging results. Toner particles having an elevated porosity will lower the cost per page and decrease the stack height of the print as well. The application of porous toners provides a practical approach to reduce the cost of the print and improve the print quality.

US Publication No. 2005/0026064 describes a porous toner particle. However control of particle size distribution along with the even distribution of pores throughout the particle is a problem. Further, particles with functional additives present primarily in discrete internal pores, and the same being substantially absent from the external particle surface, are not taught.

U.S. Pat. Nos. 3,923,704; 4,339,237; 4,461,849; 4,489,174; and EP 0083188 discuss the preparation of multiple emulsions by mixing a first emulsion in a second aqueous phase to form polymer beads. These processes produce porous polymer particles having a large size distribution with little control over the porosity. This is not suitable for toner particles. Further, particles with additives present primarily in discrete internal pores, and substantially absent from the external particle surface, are not taught.

An object of the present invention is to provide porous polymer particles, and in particular porous toner particles, with additives present primarily in discrete internal pores.

A further object of the present invention is to provide such porous particles where the additive is substantially absent from the external particle surface.

A further object of the present invention is to provide such porous polymer and toner particles with a narrow size distribution.

A still further object of the present invention is to provide a process that produces such porous polymer and toner particles reproducibly and having a narrow size distribution.

SUMMARY OF THE INVENTION

The present invention is directed towards porous particles comprising at least one polymer binder and at least one additive distinct from any pore stabilizing compound present in the particle, wherein: the polymer binder comprises a solid compositionally continuous phase having an external particle surface; discrete pores are dispersed within the solid compositionally continuous phase, forming internal pore surfaces; and the at least one additive is present primarily in the discrete pores. In further embodiments, such porous particles are provided wherein the additive is not present in the compositionally continuous binder phase, and is substantially absent from the external particle surface. The invention further is directed towards a toner set for forming a color electrophotographic image comprising a plurality of different colored toners, where at least one of the different colored toners comprise such porous particles comprising additives, and in a particular embodiment wherein at least two different colored toners comprise different pigments present in the internal pores, and have essentially equivalent triboelectric charging characteristics. The invention is further directed towards a process of making such porous particles.

DETAILED DESCRIPTION OF THE INVENTION

The use of porous toner particles in the electrophotographic process enables reducing the toner mass in the image area. For example toner particles with 50% porosity should require only half as much mass to accomplish the same imaging results. Toner particles having an elevated porosity will lower the cost per page and decrease the stack height of the print as well. The porous toner technology of the present invention thus enables a thinner image so as to improve the image quality, reduce curl, reduce image relief, save fusing energy and feel/look more close to offset printing rather than typical EP printing. In addition, colored porous particles of the present invention will narrow the cost gap between color and monochrome prints. Those potentials are expected to expand the EP process to broader application areas and promote more business opportunities for EP technology.

Porous polymer beads are used in various applications, such as chromatographic columns, ion exchange and adsorption resins, as drug delivery vehicles, scaffolds for tissue engineering, in cosmetic formulations, and in the paper and paint industries. Methods for generating pores inside polymer particles are known in the field of polymer science. However, due to the specific requirements for toner binder materials, such as suitable glass transition temperatures, crosslinking density and rheology, and sensitivity to particle brittleness that comes from enhanced porosity, the preparation of porous toners is not straightforward. Further, the known processes for formation of porous polymer particles do not enable desired control of location of toner additives in such particles. In the present invention, porous particles with effective additive location control and controlled particle size and particle size distribution are enabled using a multiple emulsion process, in conjunction with a suspension process, particularly, the ELC process. While the invention is described primarily with respect to use of the described porous particles having functional additives for toner applications, the invention is not limited to such embodiment, as the advantages of the invention with respect to controlling location of functional additives in porous particles of controlled particle size and particle size distribution is also applicable to other applications employing porous polymer beads such as described above, wherein the additive may comprise other functional additives.

The porous particles of the present invention include "micro," "meso," and "macro" pores which according to the International Union of Pure and Applied Chemistry are the classifications recommended for pores less than 2 nm, 2 to 50 nm, and greater than 50 nm respectively. The term porous particles will be used herein to include pores of all sizes, including open or closed pores.

The preferred process for making the porous particles of this invention involves basically a three-step process. The first step involves the formation of a stable water-in-oil emulsion, including a first aqueous solution dispersed finely in a continuous phase of a binder polymer dissolved in an organic solvent. This first dispersed water phase creates the pores in the particles of this invention. In the process of the invention, the first aqueous solution contains an additive which is desirably to be located in the formed porous particles, but which may be desired to be restricted in concentration in the polymer binder phase, or otherwise absent from the external particle surface. A pore stabilizing compound may also be included in the first aqueous solution, to control the pore size and number of pores in the particle, while stabilizing the pores such that the final particle is not brittle or fractured easily. The additive employed in the invention that is to be located in the formed porous particles is a particle additive distinct from any component which is employed as a pore stabilizing compound, such as further described below. Pore stabilizing hydrocolloids preferably used in the present invention include both naturally occurring and synthetic, water-soluble or water-swellable polymers such as, cellulose derivatives e.g., Carboxymethyl Cellulose (CMC) also referred to as sodium carboxy methyl cellulose, gelatin e.g., alkali-treated gelatin such as cattle bone or hide gelatin, or acid treated gelatin such as pigskin gelatin, gelatin derivatives e.g., acetylated gelatin, phthalated gelatin, and the like, substances such as proteins and protein derivatives, synthetic polymeric binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, water soluble microgels, polyelectrolytes, ionomers, and mixtures thereof.

In order to stabilize the initial first step water-in-oil emulsion so that it can be held without ripening or coalescence, if desired, it is preferable that the hydrocolloid in the water phase have a higher osmotic pressure than that of the binder in the oil phase depending on the solubility of water in the oil. This dramatically reduces the diffusion of water into the oil phase and thus the ripening caused by migration of water between the water droplets. One can achieve a high osmotic pressure in the water phase either by increasing the concentration of the hydrocolloid or by increasing the charge on the hydrocolloid (the counter-ions of the dissociated charges on the hydrocolloid increase the osmotic pressure of the hydrocolloid). It can be advantageous to have weak base or weak acid moieties in the pore stabilizing hydrocolloid that allow for the osmotic pressure of the hydrocolloid to be controlled by changing the pH. We will call these hydrocolloids "weakly dissociating hydrocolloids." For these weakly dissociating hydrocolloids the osmotic pressure can be increased by buffering the pH to favor dissociation, or by simply adding a base (or acid) to change the pH of the water phase to favor dissociation. A preferred example of such a weakly dissociating hydrocolloid is CMC that has a pH sensitive dissociation (the carboxylate is a weak acid moiety). For CMC the osmotic pressure can be increased by buffering the pH, for example using a pH 6-8 phosphate buffer, or by simply adding a base to raise the pH of the water phase to favor dissociation (for CMC the osmotic pressure increases rapidly as the pH is increased from 4-8).

Other synthetic polyelectrolytes hydrocolloids such as polystyrene sulphonate (PSS) or poly(2-acrylamido-2-methylpropanesulfonate) (PAMS) or polyphosphates are also possible hydrocolloids. These hydrocolloids have strongly dissociating moieties. While the pH control of osmotic pressure that can be advantageous, as described above, is not possible due to the strong dissociation of charges for these strongly dissociating polyelectrolytes hydrocolloids, these systems will be insensitive to varying level of acid impurities. This is a potential advantage for these strongly dissociating polyelectrolyte hydrocolloids particularly when used with binder polymers that have varying levels of acid impurities such as polyesters.

The essential properties of the pore stabilizing hydrocolloids are solubility in water, no negative impact on multiple emulsification process, and no negative impact on melt rheology of the resulting particles when they are used as electrostatographic toners. The pore stabilizing compounds can be optionally crosslinked in the pore to minimize migration of the compound to the surface affecting triboelectrification of the toners. The amount of the hydrocolloid used in the first step will depend on the amount of porosity and size of pores desired and the molecular weight of the hydrocolloid. A particularly preferred hydrocolloid is CMC and in an amount of from 0.5-20 weight percent of the binder polymer, preferably in an amount of from 1-10 weight percent and more preferably in an amount of from 2-10 weight percent of the binder polymer.

The first aqueous phase may additionally contain, if desired, salts to buffer the solution and to optionally control the osmotic pressure of the first aqueous phase as described earlier. For CMC the osmotic pressure can be increased by buffering using a pH 7 phosphate buffer. It may also contain additional porogen or pore forming agents such as ammonium carbonate.

The present invention is applicable to the preparation of polymeric particles from any type of binder polymer or binder resin that is capable of being dissolved in a solvent that is immiscible with water wherein the binder itself is substantially insoluble in water. Useful binder polymers include those derived from vinyl monomers, such as styrene monomers, and condensation monomers such as esters and mixtures thereof. As the binder polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder polymers/resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. Also, especially useful are polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides.

Preferably the acid values (expressed as milligrams of potassium hydroxide per gram of resin) of the polyester resins are in the range of 2-100. The polyesters may be saturated or unsaturated. Of these resins, styrene/acryl and polyester resins are particularly preferable.

In the practice of this invention, it is particularly advantageous to utilize resins having a viscosity in the range of 1 to 200 centipoise when measured as a 20 weight percent solution in ethyl acetate at 25° C.

Any suitable solvent that will dissolve the binder polymer and which is also immiscible with water may be used in the practice of this invention such as for example, chloromethane, dichloromethane, ethyl acetate, vinyl chloride, trichloromethane, carbon tetrachloride, ethylene chloride, trichloroethane, toluene, xylene, cyclohexanone, 2-nitropropane and the like. A particularly useful solvent in the practice of this invention are ethyl acetate and propyl acetate for the reason that they are both good solvents for many polymers while at the same time being sparingly soluble in water. Further, their volatility is such that they are readily removed from the discontinuous phase droplets as described below, by evaporation.

Optionally, the solvent that will dissolve the binder polymer and which is immiscible with water may be a mixture of two or more water-immiscible solvents chosen from the list given above. Optionally the solvent may comprise a mixture of one or more of the above solvents and a water-immiscible nonsolvent for the binder polymer such as heptane, cyclohexane, diethylether and the like, that is added in a proportion that is insufficient to precipitate the binder polymer prior to drying and isolation.

The second step in the formation of the porous particles of this invention involves forming a water-in-oil-in-water emulsion by dispersing the above mentioned water-in-oil emulsion in a second aqueous phase containing either stabilizer polymers such as polyvinyl pyrrolidone or polyvinyl alcohol or more preferably colloidal silica such as LUDOX™ or NALCO™ or latex particles in a modified ELC process such as described in U.S. Pat. Nos. 4,833,060; 4,965,131; 2,934,530; 3,615,972; 2,932,629; and 4,314,932, the disclosures of which are hereby incorporated by reference.

Specifically, in the second step, the water-in-oil emulsion is preferably mixed with a second aqueous phase containing colloidal silica stabilizer to form an aqueous suspension of droplets that is subjected to shear or extensional mixing or similar flow processes, preferably through an orifice device to reduce the droplet size, yet above the particle size of the first water-in-oil emulsion, and achieve narrow size distribution droplets through the limited coalescence process. The pH of the second aqueous phase is generally between 4 and 7 when using silica as the colloidal stabilizer.

The suspension droplets of the first water-in-oil emulsion in the second aqueous phase, results in droplets of binder polymer/resin dissolved in oil containing the first aqueous phase as finer droplets within the bigger binder polymer/resin droplets, which upon drying produces porous domains in the resultant particles of binder polymer/resin. The actual amount of silica used for stabilizing the droplets depends on the size of the final porous particle desired as with a typical limited coalescence process, which in turn depends on the volume and weight ratios of the various phases used for making the multiple emulsion.

Any type of mixing and shearing equipment may be used to perform the first step described above, such as a batch mixer, planetary mixer, single or multiple screw extruder, dynamic or static mixer, colloid mill, high pressure homogenizer, sonicator, or a combination thereof. While any high shear type agitation device is applicable to this step, a preferred homogenizing device is the MICROFLUIDIZER such as Model No. 110T produced by Microfluidics Manufacturing. In this device, the droplets of the first water phase (discontinuous phase) are dispersed and reduced in size in the oil phase (continuous phase) in a high shear agitation zone and, upon exiting this zone, the particle size of the dispersed phase is reduced to uniform sized dispersed droplets in the continuous phase. The temperature of the process can be modified to achieve the optimum viscosity for emulsification of the droplets and to control evaporation of the solvent. For the second step, where the water-in-oil-in-water emulsion is formed the shear or extensional mixing or flow process is controlled in order to prevent disruption of the first emulsion and droplet size reduction is preferably achieved by homogenizing the emulsion through a capillary orifice device, or other suitable flow geometry. The range of back pressure suitable for producing acceptable particle size and size distribution is between 100 and 5000 psi, preferably between 500 and 3000 psi. The preferable flow rate is between 1000 and 6000 mL per minute.

The final size of the particle, the final size of the pores and the surface morphology of the particle may be impacted by the osmotic mismatch between the osmotic pressure of the inner water phase, the binder polymer/resin oil phase and the outer water phase. At each interface, the larger the osmotic pressure gradient present, the faster the diffusion rate where water will diffuse from the lower osmotic pressure phase to the higher osmotic pressure phase depending on the solubility and diffusion coefficient of the water in oil phase. If either the exterior water phase or the interior water phase has an osmotic pressure less than the oil phase then water will diffuse into and saturate the oil phase. For the preferred oil phase solvent of ethyl acetate this can result in approximately 8% by weight water dissolved in the oil phase. If the osmotic pressure of the exterior water phase is higher than the binder phase then the water will migrate out of the pores of the particle and reduce the porosity and particle size. In order to maximize porosity one preferably orders the osmotic pressures so that the osmotic pressure of the outer phase is lowest, while the osmotic pressure of the interior water phase is highest. Thus, the water will diffuse following the osmotic gradient from the external water phase into the oil phase and then into the internal water phase swelling the size of the pores and increasing the porosity and particle size.

If it is desirable to have small pores and maintain the initial small drop size formed in the step one emulsion then the osmotic pressure of both the interior and exterior water phase should be preferably matched, or have a small osmotic pressure gradient. It is also preferable that the osmotic pressure of the exterior and interior water phases be higher than the oil phase. When using weakly dissociating hydrocolloids such as CMC, one can change the pH of the exterior water phase using acid or a buffer preferably a pH 4 citrate buffer. The hydrogen and hydroxide ions diffuse rapidly into the interior water phase and equilibrate the pH with the exterior phase. The drop in pH of the interior water phase containing the CMC thus reduces the osmotic pressure of the CMC. By designing the equilibrated pH correctly one can control the hydrocolloid osmotic pressure and thus the final porosity, size of the pores and particle size.

Porous particles prepared in accordance with the present invention comprise a solid compositionally continuous polymer binder phase having an external particle surface and discrete pores dispersed within the solid compositionally continuous phase, wherein an additive is present primarily in the internal pores. For purposes of the present invention, being primarily present in the internal pores requires that the additive be present in the internal pores of the particle in a greater amount than it is present in the compositionally continuous polymer binder phase. This may be obtained by incorporating a majority of the additive into the first water phase, and having only a minority (and in the extreme, none) of the additive be incorporated into the oil phase in the above described process. In accordance with a particular embodiment of the invention, it may be preferred that the additive primarily present in the internal pores of the particle is also substantially absent from the external particle surface. This may be enabled by restricting the additive to be present in the first water phase only in the above described process. A way to further control the particle surface morphology to enable formation of such substantially additive-free particle external surface in the above described process is by controlling the osmotic pressure of the two water phases. If the osmotic pressure of the interior water phase is too low relative to the exterior water phase, e.g., pores formed near the surface may burst to the surface and create an "open pore" surface morphology (surface craters) during drying in the third step of the process, thus resulting in the presence of the additive included in the first aqueous phase being potentially deposited on the particle external surface. The process is thus preferably controlled to minimize formation of such open pores, thus forming particles with primarily closed pores and a substantially pore-free surface shell and additive-free external particle surface.

A third step in the preparation of porous particles in accordance with this invention involves removal of both the solvent that is used to dissolve the binder polymer and most of the first water phase so as to produce a suspension of uniform porous polymer particles in aqueous solution. The rate, temperature and pressure during drying will also impact the final particle size and surface morphology. The details of the importance of this process depend on the water solubility and boiling point of the organic phase relative to the temperature of drying process. Solvent removal apparatus such as a rotary evaporator or a flash evaporator may be used in the practice of the method of this invention. The polymer particles may be isolated after removing the solvent by filtration or centrifugation, followed by drying in an oven at 40° C. that also removes any water remaining in the pores from the first water phase. Optionally, the particles are treated with alkali to remove the silica stabilizer. Optionally, the third step in the preparation of porous particles described above may be preceded by the addition of additional water prior to removal of the solvent, isolation and drying in order to increase the size of the pores and overall level of porosity.

In an alternative process for forming porous particles in accordance with the invention, the first aqueous solution comprising at least one additive (in addition to any pore stabilizing hydrocolloid) may be emulsified in a mixture of water-immiscible polymerizable monomers and a polymerization initiator to form the first water in oil emulsion. The resulting emulsion may then be dispersed in water containing stabilizer as described in the second step of the process to form a water-in-oil-in-water emulsion preferably through the limited coalescence process. The monomers in the emulsified mixture are polymerized in the third step, preferably through the application of heat or radiation. The resulting suspension polymerized particles may be isolated and dried as described earlier to yield porous particles. In addition the mixture of water-immiscible polymerizable monomers can contain the binder polymers listed previously.

The average particle diameter of the porous particles of the present invention is, for example, 2 to 50 micrometers, preferably 3 to 20 micrometers.

The porosity of the particles is preferably greater than 10%, more preferably between 20 and 90% and most preferably between 30 and 70%.

As describe above, porous particles in accordance with the invention comprise a solid compositionally continuous polymer binder phase having an external particle surface, and discrete pores dispersed within the solid compositionally continuous phase, forming internal pore surfaces. At least one additive, distinct from and in addition to any pore stabilizing compound which may be employed in the above described porous particle forming process, is present primarily in the discrete internal pores of such particles, and further may be substantially absent from the external particle surface. In accordance with one specific embodiment of the invention, such at least one additive may comprise, e.g., a functional additive employed in toner or other marking particles, such as at least one of a colorant, a release agent such as a wax, a magnetic particle, or a matting agent. In accordance with a further embodiment, such at least one additive may comprise a biologically active agent. The term "biologically active agent" as used herein includes, e.g., substances which are effective in the treatment of a physiologic disorder, pharmaceuticals, enzymes, hormones, growth factors, recombinant products and the like. Such biologically active agents may be incorporated as an additive in a porous polymer particle in accordance with the present invention for use, e.g., as drug delivery vehicles, scaffolds for tissue engineering, and in cosmetic formulations.

In the case of additives conventionally employed in toners, their presence on the toner particle surfaces can have inconsistent, and possible adverse, effects on controlling triboelectric charging and material handling properties, along with other electrophotographic performance properties. By restricting the location of the additive to be primarily in the internal pores contained within the compositionally continuous polymer binder phase, the impact of such additives on the triboelectric charging and electrophotographic performance of such particles can be minimized, such that a toner set comprising different toners with different additives, while advantageously exhibiting consistent charging and transfer properties, may be enabled. Porous particles in accordance with the invention may be formed by incorporating an additive which is desirably to be located in the formed porous particles, but which is desired to be substantially absent from the external particle surface, in the first aqueous solution in the above described process.

Further, many desired additives are more readily available as aqueous dispersions, and a viable route to incorporating these into chemically prepared toners or other polymer particles is to incorporate them in the first water phase of the multiple emulsion process in accordance with an embodiment of the present invention. Many wax and pigment dispersions, especially wax dispersions, e.g., are easier to make in water and more of these are available commercially. The present invention accordingly opens up a wider window of colorants and other additives for incorporating in toners and other polymeric particles.

Colorants suitable for use as an additive in the practice of the present invention may comprise e.g., a pigment or dye, as disclosed, for example, in U.S. Reissue Pat. No. 31,072 and in U.S. Pat. Nos. 4,160,644; 4,416,965; 4,414,152; and 4,229,513. As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. Colorants can generally be employed in the range of from about 1 to about 90 weight percent on a total toner powder weight basis, and preferably in the range of about 2 to about 30 weight percent, and most preferably from 4 to 20 weight percent in the practice of this invention. When the colorant content is 4% or more by weight, a sufficient coloring power can be obtained, and when it is 20% or less by weight, good transparency can be obtained. Mixtures of colorants can also be used. Non-aqueous soluble colorants employed as an additive in accordance with the invention may be pre-dispersed in the first aqueous phase prior to forming the first emulsion.

In a particular embodiment, a toner set for forming a color electrophotographic image is provided, comprising a plurality of different colored toners, where at least two of the different colored toners comprise porous particles having additives primarily in internal pores in accordance with the particles of the present invention. Such a toner set preferably comprises at least two different colored toners comprising different pigments present primarily in the internal pores, and wherein such pigments are substantially absent from the external surfaces of the toners. By providing different toners with different pigments located primarily with internal pores, such different toners may advantageously exhibit essentially equivalent triboelectric charging characteristics. Toner sets in accordance with various embodiments may comprise, e.g., combinations of cyan, magenta, yellow, and black toner formulations, as well as further differently colored, white, and clear toner formulations.

Release agents suitable for use as an additive in accordance with the present invention preferably are waxes. Any wax may be used for the purpose of the present invention. Examples of such waxes include polyolefins such as polyethylene wax and polypropylene wax, and long chain hydrocarbon waxes such as paraffin wax. Another class of waxes are carbonyl group-containing waxes which include long-chain aliphatic ester waxes, as well as polyalkanoic acid ester waxes such as montan wax, trimethylolpropane tribehenate, glycerin tribehenate; polyalkanol ester waxes such as tristearyl trimellilate and distearyl maleate; polyalkanoic acid amide waxes such as trimellitic acid tristearyl amide. Examples of useful eliphatic amides and aliphatic acids include oleamide, eucamide, stearamide, behenarnide, ethylene bis(oleamide), ethylene bis(stearamide), ethylene bis(behenamide) and long chain acids including stearic, lauric, montanic, behenic, oleic and tall oil acids. Particularly preferred aliphatic amides and acids include stearamide, erucamide, ethylene bis(stearamide) and stearic acid. The aliphatic amide or aliphatic acid is present in an amount from about 0.5 to 30 percent by weight, preferably from about 0.5 to 10 percent by weight. Mixtures of aliphatic amides and aliphatic acids can also be used. One useful stearamide is commercially available from Witco Corporation as Kemamide S™. A useful stearic acid is available from Witco Corporation as Hysterene 9718™. Naturally occurring polyalkanoic acid ester waxes include Carnauba wax. A particularly useful class of ester waxes is made from long chain fatty acids and alcohol. Examples of this class are Licowax series made by Clariant Corp. derived from montanic acid. Another example useful in toner applications are the WE series made by NOF which is a highly purified narrow melting solid ester wax. Fluorinated waxes such as Polyfluo 190, Polyfluo 200, Polyfluo 523XF, Aqua Polyfluo 411—all polyethylene/PTFE functionalized waxes, Aqua Polysilk 19, Polysilk 14—all polyethylene/PTFE/amide functionalized waxes available from Micro Powders Inc. are also useful. The choice of wax is not limited to a single wax. Two or more of the above waxes may be incorporated into the dispersion to give improved toner performance. The wax WE-3 made by NOF, a long-chain ester wax made from long chain fatty acids and alcohol, is a preferred wax because it has a narrow melting range with little melting that takes place below 40° C. Preferably, the wax employed has a percent crystallinity of greater than 50%.

Although waxes that may be used in the present invention can have a broad range of applications, it is generally desired for toner applications that the wax have a melting point of 40-160° C., preferably 50-120° C., more preferably 60-90° C. A melting point of wax below 40° C. may adversely affect the heat resistance and preseivability of the toner, while too high a melting point—i.e. in excess of 160° C.—is apt to cause cold offset of toner when the fixation is performed at a low temperature. Additionally, the melting peak of wax as obtained by methods such as differential scanning calorimetry, and it is preferred that the onset of melting to the peak melting temperature be greater than 20° C., preferably greater than 50° C. Preferably, the wax has a melt viscosity of 5-1000 cps, more preferably 10-100 cps, at a temperature higher by 20° C. than the melting point thereof. When the viscosity is greater than 1000 cps, the anti-hot offset properties and low fixation properties of the toner are adversely affected. The amount of the wax in the toner is generally 0.1-40% by weight, preferably 0.5-10% by weight, based on the weight of the toner.

In a printer a fusing roller is used to apply heat and pressure to an unfused toner image on a receiver sheet such as a clay-coated paper stock. The toner particles are fused together and adhered to the receiver sheet, and become spread out to a certain degree. It is observed that, in general, as the temperature of the fuser roller is increased, the propensity of the toner to offset to the fuser roller increases. However, if the wax release additive is sufficiently released from the toner the offset will not occur and the image will not be damaged.

Examples of useful magnetic materials for use as an additive in the practice of the present invention include mixed oxides of iron, iron silicon alloys, iron aluminum, iron aluminum silicon, nickel iron molybdenum, chromium iron, iron nickel copper, iron cobalt, oxides of iron and magnetite. Other suitable magnetic materials that can be present in the toner include, but are not limited to, magnetic material containing acicular magnetites, cubical magnetites, and polyhedral magnetites. The amount of the magnetic additive material for the toner particles of the present invention can be any amount sufficient to preferably meet commercial needs, such as providing a sufficient signal strength for the toners developed as an image. The magnetic toner particles of the present invention in a particular embodiment contain at least one type of magnetic additive or material, such as soft iron oxide ($Fe_3O_4$) that makes the toner ferro-magnetic, which may be advantageous for formation of MICR (Magnetic Ink Character Recognition) toner particles.

The additives useful in the practice of this invention are introduced into the pore by incorporating them in the first water phase. In a particular embodiment, the additives may be incorporated into the first aqueous phase in the form of solid particle dispersions of the additives. Preparation of solid particle dispersions may include the combination of the solid particles to be reduced in size with a dispersant and a liquid medium in which the particles are to be dispersed, in suitable grinding mill in which the particles are reduced and dispersed. The dispersant, an important ingredient in the mill grind, is chosen to allow the solid to be ground compatible with the liquid medium and final product composition in which it is dispersed. The dispersants used are preferably selected to obtain efficient particle size reduction of the solid during milling, provide good colloidal stability of the particles to prevent agglomeration after milling and impart the desired properties of the final toner particle in which it incorporated.

Milling can take place in any suitable grinding mill. Suitable mills include an airjet mill, a roller mill, a ball mill, an attritor mill, a vibratory mill, a planetary mill, a sand mill, and a bead mill. A high speed mill is particularly useful. By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, x, and the impeller diameter. Sufficient milling media velocity is achieved, for example, in Cowles-type saw tooth impeller having a diameter of 40 mm when operated at 9,000 rpm. Useful proportions of the milling media, the pigment (or other additive to be incorporated), the liquid dispersion medium and dispersant can vary within wide limits and depends, for example, upon the particular material selected and the size and density of the milling media etc. The process can be carried out in a continuous or batch mode.

In batch milling, a slurry of milling media, liquid, pigment (or other additive to be incorporated), and dispersant is prepared using simple mixing. This slurry can be milled in conventional high energy batch milling processes such as high speed attritor mills, vibratory mills, ball mills, etc. This slurry is milled for a predetermined length of time to allow communication of the active material to a minimum particle size. After milling is complete, the dispersion of active material is separated from the milling media by a simple sieving or filtration with a barrier to the milling media but not the milled active material, e.g. a filter with a pore size of below 5 μm.

In continuous media recirculation milling, a slurry of milling media, liquid, pigment (or other additive to be incorporated), and dispersant can be continuously recirculated from a holding vessel through a conventional media mill which has a media separator screen adjusted to hold back the milling media while allowing free passage of the dispersion throughout the circuit. After milling is complete, the dispersion of active material is separated from the milling media by simple sieving or filtration.

With either of the above modes the useful amounts and ratios of the ingredients of the mill grind will vary widely depending upon the specific materials. The contents of the milling mixture comprise the mill grind and the milling media. The mill grind comprises pigment (or other additive), dispersant and a liquid carrier such as water. For aqueous filter slurries, the solid is usually present in the mill grind at 1 to 50 weight %, excluding the milling media. The weight ratio of solid to dispersant is 20:1 to 1:2. The high speed mill is a high agitation device, such as those manufactured by Morehouse-Cowles, Hockmeyer et al.

The milling time can vary widely and depends upon the pigment (or other additive to be incorporated), mechanical means and residence conditions selected, the initial and desired final particle size, etc. For aqueous mill grinds using the useful solids, dispersants, and milling media described above, milling times will typically range from 1 to 100 hours. The milled particle concentrate is conveniently separated from the milling media by filtration.

Where their presence on the particle external surface is not to be absolutely restricted, additives generally present in electrostatographic toner particles (or other porous particles) may also be added to the binder polymer phase prior to dissolution in the solvent, or after the dissolution step itself, in the preparation of porous particles in accordance with the present invention, such that they will be present in the binder phase and on the external particle surface of the resulting porous particles, as long as at least one additive is restricted to being primarily located in the internal pores. Such additives maybe selected from those discussed above, as well as further additives that are intentionally added to control external particle surface properties (e.g., charge control agents). By enabling control of the location of additives, the present invention advantageously enables similar charge control agents to be employed on the particle external surfaces for multiple distinct toners incorporating other additives that may differentially impact the electrophotographic properties of the distinct toners.

The term "charge control" refers to a propensity of a toner addendum to modify the triboelectric charging properties of the resulting toner. A very wide variety of charge control agents for positive charging toners are available. A large, but lesser number of charge control agents for negative charging toners, is also available. Suitable charge control agents are disclosed, for example, in U.S. Pat. Nos. 3,893,935; 4,079,014; 4,323,634; 4,394,430; and British Patents 1,501,065 and 1,420,839. Charge control agents are generally employed in small quantities such as, from about 0.1 to about 5 weight percent based upon the weight of the toner. Additional charge control agents that are useful are described in U.S. Pat. Nos. 4,624,907; 4,814,250; 4,840,864; 4,834,920; 4,683,188; and 4,780,553. Mixtures of charge control agents can also be used.

The porous particles of the invention can be spherical or irregular in shape. A spherical particle is defined as a three dimensional object which has all points on the surface essentially equidistant from a central point, while a non-spherical particle will have individual points on the surface having varying distances from a central point. Such non-spherical particles may be seen, e.g., as irregular, or oblong, or wrinkled shapes and surfaces. The shape of the particles also has a bearing on the electrostatic toner transfer and cleaning properties. Thus, for example, the cleaning efficiency of toner particles have been found to improve as the sphericity of the particles is reduced. A number of procedures to control the shape of toner particles are know in the art. In the practice of this invention, additives may be employed in the second water phase or in the oil phase if necessary. The additives may be added after or prior to forming the water-in-oil-in-water emulsion. In either case the interfacial tension is modified as the solvent is removed resulting in a reduction in sphericity of the particles. U.S. Pat. No. 5,283,151 describes the use of carnauba wax to achieve a reduction in sphericity of the particles. U.S. Pat. No. 6,380,297 describes addition of various anionic, nonionic, and cationic materials as shape control additives that may be added after homogenization of the an organic phase in a water phase in order to form irregularly shaped particles while maintaining desirable narrow particle size distribution. US Publication No. 2008/0145779 filed Dec. 15, 2006 entitled "Toner Particles of Controlled Morphology" describes the use of certain metal carbamates that are useful to control sphericity and US Publication No. 2008/0145780 filed Dec. 15, 2006 entitled "Toner Particles of Controlled Morphology" describes the use of specific salts to control sphericity. US Publication No. 2007/0298346 entitled "Toner Particles of Controlled Morphology" describes the use of quaternary ammonium tetraphenylborate salts to control sphericity. These patents and applications are incorporated by reference herein.

The toner particle shape may be characterized by the ratio of two dimensions using image analysis. One device available measuring water dispersions of toner is the Sysmex FPIA3000 distributed by Malvern Instruments, Ltd. In this instrument, a stream of toner dispersion is sheared by sheath jets to orient the particle so that the largest two dimensions can be imaged with magnifying optics, a xenon flash lamp, and a CCD array. The software provided with the Sysmex FPIA3000 detects each particle perimeter, finds the largest spacing between a first pair of tangent lines to define the largest dimension, finds the widest spacing between a second pair of tangent lines perpendicular to the first pair tangent lines to define the second largest dimension, and report the major aspect ratio $R_b$ as the second largest dimension divided by the largest dimension. Reliable mean aspect ratios can be determined by imaging 9,000 to 10,000 particles provided the toner is adequately dispersed and the concentration is low enough to prevent substantial coincidence of the particles.

Due to the orientation of the particles, the major aspect ratio $R_b$ reported by the Sysmex FPIA3000 is insufficient to completely characterize the shape of a particle. The sphericity of a particle is determined in large part by the smallest dimension that is not imaged by the Sysmex FPIA3000. The smallest dimension may be inferred by comparing the spherical equivalent number diameter $D_{sc}$ measured by an electric-zone sensing device such as the Coulter Multisizer model IIE of M3 to the circular equivalent number diameter $D_{ce}$ and major aspect ratio $R_b$, reported by the Sysmex FPIA3000. An ellipsoidal equivalent minor aspect ratio $R_c$ can be computed as the square root of $R_b$ times the cube of the ratio of $D_{se}$ over $D_{ce}$. For accurate calculation of $R_c$, it is necessary that the size range of the Sysmex data be limited to that of the Coulter Multisizer and that the impact on $D_{se}$ of false fines count in the Multisizer be eliminated by further truncating both Sysmex and Multisizer data. The Sysmex data is truncated at the first bin below the number mean $D_{ce}$ where there is less than 0.1% when the data is binned on logarithmic diameter scale and the width of the bins are equal to the Multisizer bins. The truncation size for the Multisizer is found iteratively by taking the ratio of the $D_{se}$ over $D_{ce}$ times the truncation size for the Sysmex.

The particle shape may be characterized by the geometric mean aspect ratio $R_x$ defined as $$R_s = \sqrt{R_b R_c}$$

where $R_b$ represents the major aspect ratio reported by the Sysmex FPIA3000 and $R_c$ represents the ellipsoidal equivalent minor aspect ratio $R_c$ computed as described above. To ensure desired nonsphericity, $R_x$ may preferably be less than 0.80, more preferably less than 0.74, and even more preferably, less than 0.70. In addition to being nonspherical, it may be further preferred that the particle shape be noncylindrical for good cleaning using blade cleaners. To ensure desired noncylindricity, the ratio $R_c$ over $R_b$ may preferably be less than 0.90, more preferably less than 0.85, and even more preferably, less than 0.80. Shape control agents may be further employed to control particle surface roughness, as well as overall non-sphericity, as further described in the above referenced patents.

Toner particles of the present invention may also contain spacing agents in the form of surface treatments. Surface treatments are typically in the form of inorganic oxides or polymeric powders with typical particle sizes of 5 nm to 1000 nm. The amount of the agent on the toner particles is an amount sufficient to modify the charge or to permit the toner particles to be stripped from the carrier particles in a two component system by minimizing the electrostatic forces associated with the charged image or by mechanical forces. Yet another purpose of the spacing agent is to modulate the adhesive and cohesive forces in transfer of the toned image. These forces are minimized at a high degree of separation. Preferred amounts of the spacing agent are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, preferably uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution o)n the surface of the toner particles, the mixture can be sieved to remove any agglomerated spacing agent or agglomerated toner particles. Other means to separate agglomerated particles can also be used for purposes of the present invention.

The most common surface treatments are surface modified filmed silicas, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 µm in diameter (more preferably about 0.1 µm), such as acrylic polymers, silicone-based polymers, styrenic polymers, fluoropolyners, copolymers thereof, and mixtures thereof While spacing agents are useful they do not isolate the effect of additive components on the surface of the underlying core toner. Toner is often exposed to violent collisions and shearing motion to induce a static charge on the toner, to develop latent images on photoreceptors with toner, to transfer the developed images to intermediate and final receivers, and in other ancillary processes involving toner such as cleaning. Violent collisions of the toner particle normal to the surface of the toner direct the impulse force on the surface treatment. The impulse force can exceed the strength of the toner core material (usually a melt adhesive polymer with a glass transition temperature, Tg, in the range of 50 to 60 degrees centigrade). The kinetic energy of the collision is transformed into heat and, because of the short duration of the collision event, the heat is localized at the surface treatment contact points with the toner particle and other surface. The local temperature at the contact briefly exceeds the Tg and the toner core material will plastically deform around the surface treatment increasing the area of contact. With increased residence time in the station, particularly under low image content printing, the surface treatment is pushed into the toner until it is flush with the surface. Further impaction works the toner core material in plastic deformation covering over and engulfing the surface treatment. As the surface treatment becomes increasingly embedded and engulfed, it is less effective at maintaining the desired separation between the toner particle and other surfaces. At this point the charging and electrophotographic performance may be dictated by the presence of the additives at the toner surface. Hence incorporating colorants and other additives in the pores mitigates this problem.

The invention will further be illustrated by the following examples. They are not intended to be exhaustive of all possible variations of the invention.

Materials:

The binder used for making toners described in these examples were bisphenol-A based polyester polymers Kao E and Kao N obtained from Kao Specialties Americas LLC a part of Kao Corporation, Japan. Carboxymethyl cellulose molecular weight approximately 250K as the sodium salt, was obtained from Acros Organics. Colloidal silicas, NALCO 1060™ was obtained from Nalco Chemical Company and LUDOX TM™ from DuPont, both as 50 weight percent dispersions.

The wax used in all the examples was the ester wax WE-3® from NOF Corporation. Carbon black dispersion in water, Sensijet SDP 2000 and 1000, were obtained from Sensient Corp. Aqueous cyan PB 15:4 pigment dispersions (Cab-o-jet) were obtained from Cabot Corporation. Poly(ethyl oxazoline) MW 50K was obtained from Aldrich.

Charge/mass (Q/m) Measurements of the Toners

Charge per mass was measured off-line by MECCA method, where the test samples that are measured are prepared by exercising the developer with rotating magnets to create a magnetic field that results in the physical mixing of the particles causing the particles to charge for a period of 2 minutes and then 10 additional minutes. The toner Q/m ratio was measured in a MECCA device comprised of two spaced-apart, parallel, electrode plates which applies both an electrical and magnetic field to the developer samples, thereby causing a separation of the two components of the mixture, i.e., carrier and toner particles, under the combined influence of a magnetic and electric field. A 0.100 g sample of a developer mixture is placed on the bottom metal plate. The sample is then subjected for thirty seconds to a 60 Hz magnetic field and potential of 2000-2500 V across the plates, which causes developer agitation. The toner particles are released from the carrier particles under the combined influence of the magnetic and electric fields and are attracted to and thereby deposit on the upper electrode plate, while the magnetic carrier particles are held on the lower plate. An electrometer measures the accumulated charge of the toner on the upper plate. The toner Q/m ratio in terms of microcoulombs per gram ($\mu$C/g) is calculated by dividing the accumulated charge by the mass of the deposited toner taken from the upper plate. The Q/M ratio is then converted to a charge per external surface area Q/S in microcoulomrbs per meter squared ($\mu$C/m2) taking into account the density of solid continuous phase, $\rho$, the porosity of the particle, $\phi$, and the volume median particle size from the Coulter measurements, d.

Covering Power Measurements

The tinctorial strength of the toner was evaluated as a "normalized covering power" value. A series of patches of varying density of toner was prepared on clear film; the weight of toner in each patch and area of each patch was measured. A 125 micron thick piece of high gloss Teflon coated Kapton® film was placed over the patch. The patches were then fused in a roller fuser controlled at a temperature hot enough (160° C.) and speed slow enough (0.026 inches/second) such that the degree of toner flow was maximized and a continuous thin film of toner resulted. It is under these conditions the tinctorial strength of the toner is dependent upon the dispersion quality in the toner and not the degree of toner flow affected by the toner rheology. Gloss of the fused patch was typically greater than 90 at 60 degrees. The transmission densities of the resulting fused patches were measured using an X-Rite densitometer. A straight line was drawn through the data for each toner, and the weight per unit area of toner was then calculated at a transmission density of 1.0. The reciprocal of this value, in units of square centimeters per gram, is defined as the covering power (the area covered to a transmission density of 1.0 by one gram of toner). This value was normalized by dividing by the level of pigment in the toner. As the normalized covering power ($cm^2$/g toner/g pigment) increases, the "yield" of the toner increases, that is, less mass is needed to create the same amount of density/area coverage in a print.

Particle Size

The particle size and size distribution were characterized by a Coulter Particle Analyzer. The volume median value from the Coulter measurements was used to represent the particle size of the particles described in these examples. In some cases the particle size was measured using light scattering with the Horiba LA-920 analyzer. In these cases the mode value was used to characterize the particle size.

Porosity Measurements

The level of porosity of the particles of the present invention was measured using a combination of methods. The outside or overall diameter of the particles is easily measured with a number of aforementioned particle measurement techniques, but determining the extent of particle porosity can be problematic. Determining particle porosity using typical gravitational methods can be problematic due to the size and distribution of pores in the particles and whether or not some pores break through to the particle surface. To accurately determine the extent of porosity in the particles of the present invention a combination of conventional diameter sizing and time-of-flight methods was used. Conventional sizing methods include total volume displacement methods such as Coulter particle sizers or image based methods such as the Sysmex FPIA3000 system. The time-of-flight method used to determine the extent of porosity of the particles in the present invention includes the Aerosizer particle measuring system. The Aerosizer measures particle sizes by their time-of-flight in a controlled environment. This time of flight depends critically on the density of the material. If the material measured with the Aerosizer has a lower density due to porosity then the calculated diameter distribution will be shifted artificially low. Independent measurements of the true particle size distribution via alternate methods (e.g. Coulter or Sysmex) can then be used to fit the Aerosizer data with particle density as the adjustable parameter. The method of determining the extent of particle porosity of the particles of the present invention is as follows. The outside diameter particle size distribution is first measured using either the Coulter or Sysmex particle measurement systems. The mode of the volume diameter distribution is chosen as the value to match with the Aerosizer volume distribution. The same particle distribution is measured with the Aerosizer and the apparent density of the particles is adjusted until the geometric median volume (D50%) of the two distributions matches. One minus the ratio of the calculated and solid particle densities is taken to be the extent of porosity of the particles. The porosity values generally have uncertainties of +/−10%. Porosity was in some cases determined by Hg intrusion porosimetry.

Off-line Fusing Performance

Images comprising patches were prepared on an electrophotographic printing device and transferred to LUSTRO.™. Laser paper, a 118 g per square meter basis weight lithographic coated paper stock obtained from the S. D. Warren Company. The printer parameters including the charging voltage, the magnetic brush bias voltage, and the toner concentration in the developer, were adjusted such that the highest density patches had a toner laydown of approximately 1 mg/cm.sup.2. The EK250 fuser roller fuser apparatus comprised a heated, smooth surfaced fluoropolymer/silicone polymer blend coated fusing roller, a heated pressure roller, and drive and loading mechanisms such that a fusing nip time of 60 msec was realized. The rollers were held to the desired surface temperature by means of a temperature sensor and control circuitry. For each example, a fusing temperature series in 5.5 C increments was run up to 182 C. At each temperature the patch and the fuser roller were inspected for image offset.

Microscopy

SEM micrographs were obtained by embedding the toners in poly vinyl butyral (butvar). The samples were then placed in a microtome and faced off with a diamond knife and coated with Au/Pd for conductivity. The coated samples were examined at 25 kv at various magnifications to allow for the examination of pigment in the pores.

Some samples were freeze fractured by embedding in epoxy, cooled in liquid nitrogen and fractured.

TEM sections were prepared by using a Reichert Ultracut equipped with a wet sectioning diamond knife. The sections were cut and floated onto the surface of water and picked up using 100 mesh grids.

EXAMPLES

Preparation of the Additive Dispersions

WX-1: Wax Disersion in Ethyl Acetate

Dispersion WX-1 was prepared by combining 750 g of WE-3® wax from NOF Corporation, 1125 g of a 10% solution of Ceramer 1608® dispersant from Baker Hughes Corporation in ethyl acetate and 3125 g of ethyl acetate. The dispersion was recirculated through an LME4 Netzsch media mill at containing 0.35 mm zirconium silicate media for 150 minutes at a temperature of 25C, a flow rate of 1 L/min and a shaft speed of 1800 rpm. The final dispersion contained a mean particle size of 0.391 microns as measured by a Horiba LA-920 particle analyzer and 13.71 wt % wax.

WX-2: Wax Dispersion in Water

Dispersion WX-2 was prepared by combining three dispersions together. Each dispersion was prepared by adding 2.5 g of WE-3® wax from NOF Corporation, 0.38 g Tergitol 15-S-7® surfactant from Dow Corporation, 22.13 g high purity water and 60 mL of 1.8 min zirconium oxide beads to a 4 oz jar. The jar was rolled at a speed of 65 ft/min for 6 days. After milling, the dispersion was separated from the beads by filtration. The final dispersion contained a median particle size of 0.191 microns as measured by a UPA150 Particle Analyzer® and contained 8.55 wt % wax.

CB 1: Carbon Black Dispersion in Ethyl Acetate

Dispersion CB-1 was prepared by combining 1500 g of BP280® carbon from Cabot Corporation, 45 g of a Zetasperse 2100® dispersant from Air Products Corporation, 7500 g of a 10% solution of Kao N® polyester polymer from Kao Corporation in ethyl acetate and 955 g of ethyl acetate. The dispersion was recirculated through an LME4 Netzsch media mill at containing 0.35 mm zirconium silicate media for 180 minutes at a temperature of 25C, a flowrate of 1 L/min and a shaft speed of 1800 rpm. The final dispersion contained a mean particle size of 0.388 microns as measured by a Horiba LA-920 particle analyzer and 15.21 wt % carbon.

M1: Magnetic Particle Dispersion in Water

A finely divided concentrate of a magnetic material was made by milling 20 parts of Co-surface treated-γ-iron oxide powder supplied by Toda Kogyo under the trade designation CSF 4085V2, major axis mean particle size 0.2-0.25 µm and 20 parts of a 50% by weight solution of the dispersant Syn Fac 8337 (sold by Milliken Chemical) in 70 parts deionized water in a small media mill. The sample was milled for 1-1.5 hours until the average particle size was down to 0.25 µm.

Example 1(Invention)

Carbon Black in Pores

Figure 1:
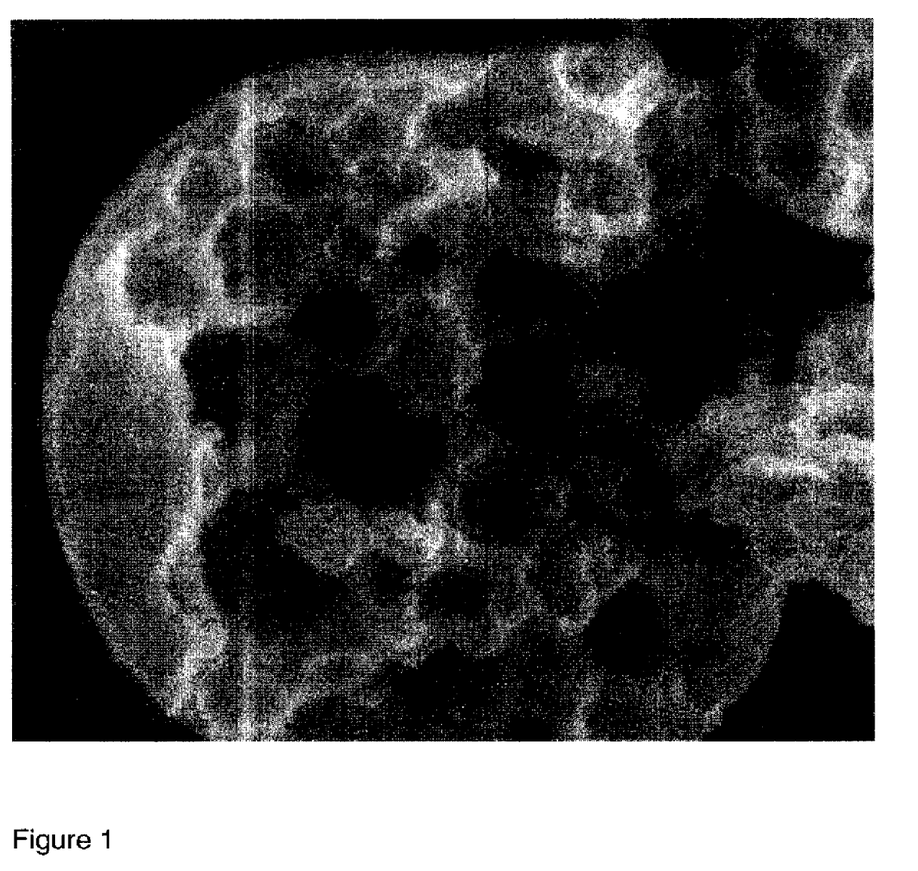
FIG. 1 is a scanning electron microscope (SEM) image of a fractured sample of the particles obtained in Example 1.
Figure 2:
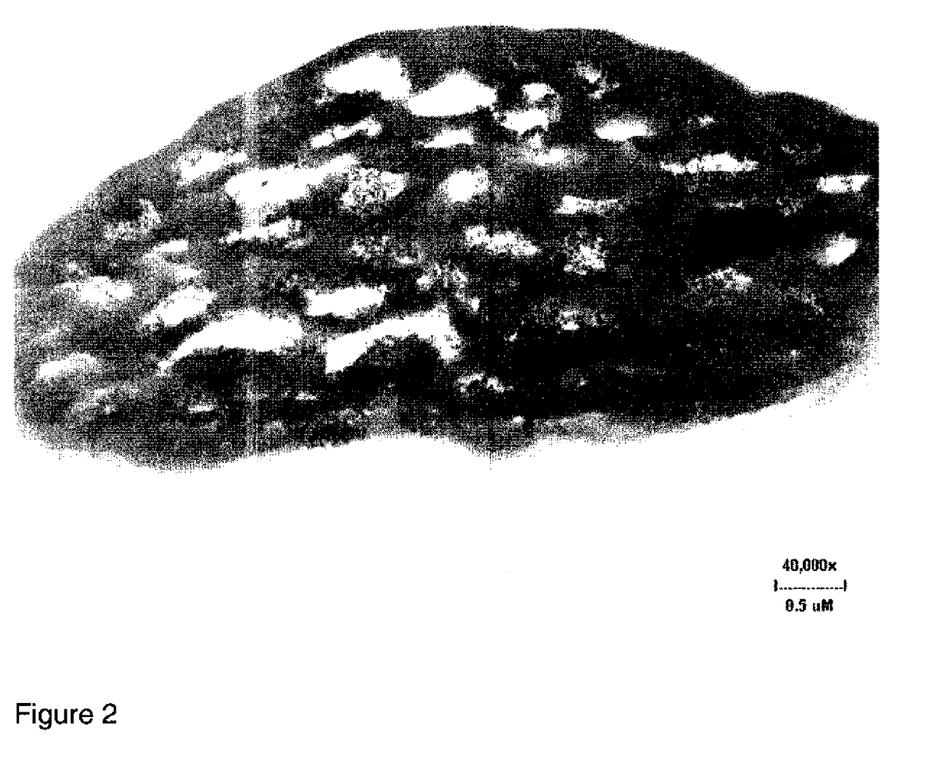
FIG. 2 is a transmission electron microscope (TEM) image of a cross-section of a particle obtained in Example 1.

A 5 wt % solution of CMC molecular weight 250K, 48.58 grams, was added to 26.91 grams of Sensjet 2000(14.5 wt %) along with 37.01 grams distilled water. This was dispersed in 242.9 grams of a 20 weight % solution of Kao E polymer resin in ethyl acetate for two minutes at 6800 RPM using a Silverson L4R homogenizer. The resultant water-in-oil emulsion was further homogenized using a Microfluidizer Model #110T from Microfluidics at a pressure of 8900 psi. A 229 g aliquot of the resultant very fine water-in-oil emulsion was dispersed, using the Silverson homogenizer again for two minutes at 2800 RPM, in 375 grams of the second water phase comprising a 300 mM pH 4 citrate-phosphate buffer and 16.8 grams of NALCO 1060™, followed by homogenization in a orifice homogenizer at 1000 psi to form a water-in-oil-in-water double emulsion. The ethyl acetate was evaporated using a Heidolph Laborata rotary evaporator at 40° C. under reduced pressure. The resulting suspension of beads containing 8 weight percent carbon black were filtered using a glass fritted funnel, washed with water, resuspended in water at a pH of 12.5 and stirred for 30 minutes to remove the silica on the particle surface. The particle were isolated by filtration and washed until the conductivity of the filtrate was below 20 µS. The particles were dried in a vacuum oven set at 35C for 16 hours. The particle size was 7.4 microns and the porosity was 31%. FIG. 1 is a scanning electron microscope image of a fractured sample of the particles, exhibiting the distinct internal pores. FIG. 2 shows a TEM of a cross-section of the toner particle where the carbon black can be clearly seen contained in the pores as submicronic particles. The charge, Q/S measured at 2 and 10 minutes were −72 and −62 $\mu C/m^2$ respectively. This shows that the charge of the bare toner was good. The normalized covering power (CP) was good at 310 $cm^2/g^2$ and demonstrated that isolation of carbon in the pores did not significantly affect the tinctorial strength.

Example 2 (Invention)

Carbon Black in Pores

Example 2 was made as in Example 1 except that 30 g of a 5 weight % CMC was used in the first water phase along with 10.7 g water and 42.6 g of Sensjet 1000 (14.1 wt %). The oil phase contained 34.4 g ethyl acetate and 215.6 g of a 20.4 wt % solution of Kao N in ethyl acetate. An aliquot of 288.5 g of the water in oil emulsion was dispersed in 482.2 g of the buffer and 26.8 g Nalco 1060. Prior to evaporation the emulsion was diluted 1:1 with a 0.03 wt % poly(ethyl oxazoline) solution in water.

The particle size of the resultant nonspherical, 12 wt % carbon black containing particles, was 6.6 microns and the porosity was 50%. The charge, Q/S measured at 2 and 10 minutes were −11 and −35 $\mu C/m^2$ respectively. This shows that the charge of the bare toner was good. CP was good at 320 $cm^2/g^2$ and demonstrated that isolation of carbon in the pores did not significantly affect the tinctorial strength.

Example 3 (Comparative)

Carbon in Continuous Binder Phase

The check Example 3 was made as in Example 1 except that 77.4 g of a 2 weight % CMC was used in the first water phase and the carbon black was incorporated in the oil phase which contained 33.6 g ethyl acetate and 147.3 g of a 24.6 wt % solution of Kao N in ethyl acetate and 39.5 g of CB-1 dispersion containing 15.2% carbon and 29.7 grams of WX-1. An aliquot of 250 g of the water in oil emulsion was dispersed in 399 g of the buffer and 16.4 g Nalco 1060. Prior to evaporation the emulsion was diluted 1:1 with a 0.03 wt % poly(ethyl oxazotine) solution in water.

The particle size of the nonspherical, 12 wt % carbon black containing particles, was 6.7 microns and the porosity was 55%. The charge, Q/S measured at 2 and 10 minutes were −4 and −7 µC/m2 respectively. This shows that the charge of the bare toner was not good. CP was good at 440 $cm^2/g^2$ and typical of carbon black in the binder phase.

Example 4 (Inventive)

Cyan Pigment in Pores

Figure 3:
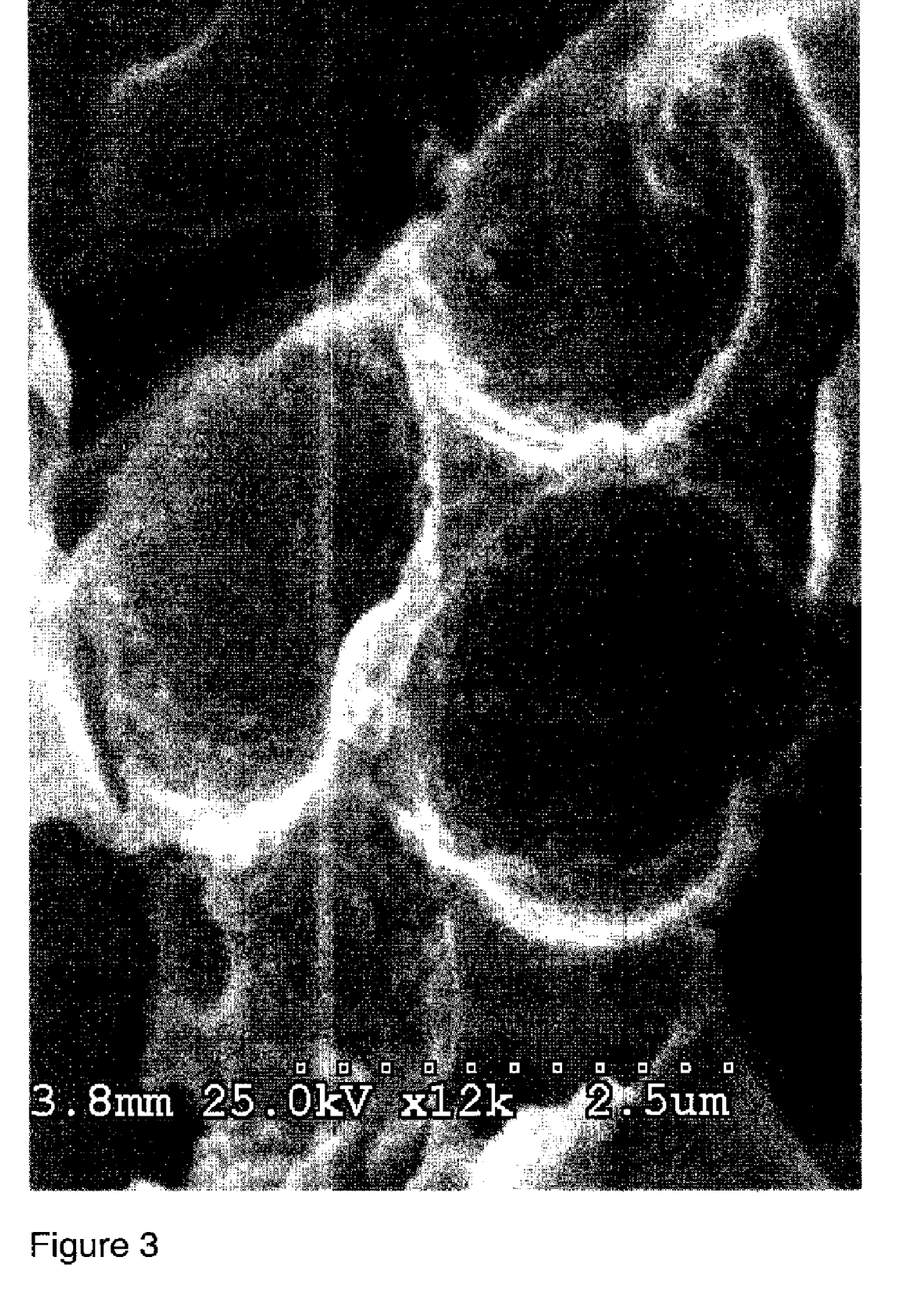
FIG. 3 is an SEM image of a freeze fractured particle obtained in Example 4.

A porous toner containing cyan pigment in the pores was made using a procedure similar to the one in Example 1 except that a water dispersed cyan PB15:4 Cabojet 250C (10% solids) was used in place of the Sensijet in Example 1. The first water phase contained 174.4 g of pigment dispersion, 116.6 g of 5% CMC and 151.7 g of distilled water. The oil phase used was 971.5 g. A 915 g aliquot of the emulsion was added to 1500 g of buffer containing 85 g Nalco 1060. Prior to evaporation of the solvent, a 1:1 dilution of the emulsion was performed with a 0.03 wt % solution of poly (ethyl oxazoline) in water. The resultant 6.4 micron non-spherical particles containing 9 wt % pigment had a porosity of 50% and the charge, Q/S measured at 2 and 10 minutes were −23 and −42 $\mu C/m^2$, demonstrating good charge and porosity with pigment located in the pores. FIG. 3 is an SEM image of a freeze fractured particle of Example 4 and shows the pigment contained in the pores as submicronic particles.

Example 5 (Inventive)

Wax and Cyan in Pore

These particles were made as described in Example 1 except that 16.6 g CMC was used along with 22.43 g of the aqueous pigment dispersion, and 23.4 g of WX-2 dispersion. This was emulsified into 88.88 g of a 21.8% Kao E solution in ethyl acetate along an additional 36.12 g of the same solvent. A 113 g aliquot of this emulsion was added to 181.5 g of the buffer containing 9.85 g Nalco 1060 and homogenized as before. A 137 g of the resulting double emulsion was diluted with 41.3 g of a 0.1 wt % poly(ethyl oxazoline) solution prior to evaporation. The resultant particles containing 8 wt % wax and 9 wt % cyan pigment in the voids were 4.5 microns in size, had a porosity of 32% and a tribocharge, Q/S measured at 2 and 10 minutes of −23 and −30 µC/m2 respectively. Differential scanning calorimetry of the resultant particles showed a well resolved melting peak for the wax contained in the pore compared to Example 6 where the wax was in the oil phase. The toner demonstrated good fusing and release behavior in the off-line fusing performance test. The hot offset release behavior passed at 182° C. and was equivalent to the behavior shown in Example 6.

Example 6

Cyan Pigment in the Pore and Wax in Continuous Binder Phase

These particles were made as described Example 3 except that 133.2 g of a 5 wt % CMC solution in water was added to 134.7 g water along with 98.8 g of a 20.22 wt % PB15:4, aqueous dispersion, from Cabo-jet Corporation. The oil phase contained 55.5 g ethyl acetate, 902.8 g of a 20.4 wt % solution of Kao N and 131.8 g of the wax dispersion WX-1. Prior to evaporation the double emulsion was diluted 1:1 with a 0.0015 wt % solution of poly(ethyl oxazoline) in water. The particles containing 9 wt % cyan pigment in pore and 8 wt % wax in the continuous binder phase were isolated as usual and the volume median particle size obtained was 6.7 microns.

Figure 4:
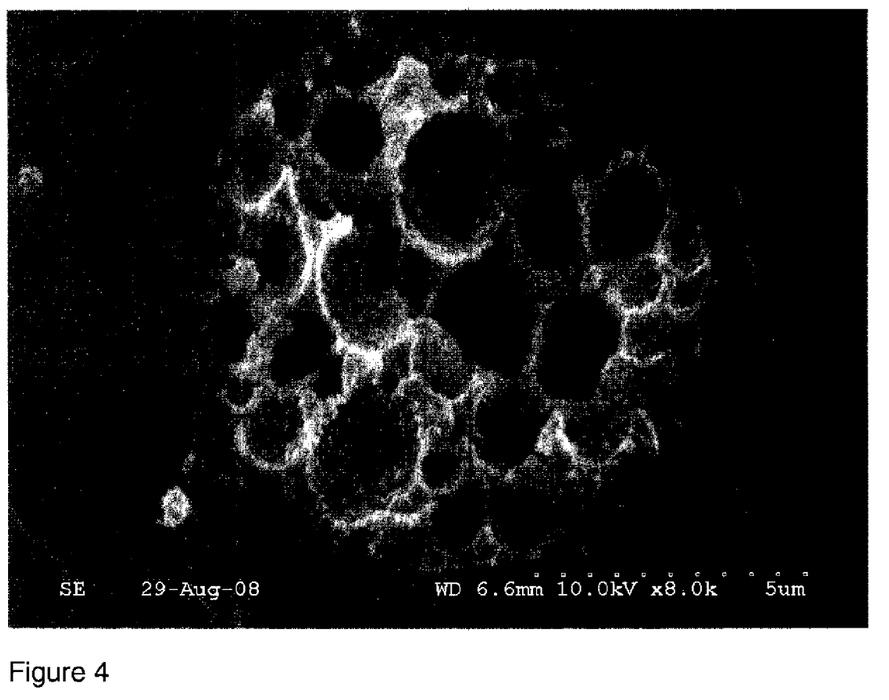
FIG. 4 is an SEM image of a faced-off porous particle obtained in Example 6.

The particles had a porosity of 40% and a tribocharge, Q/S measured at 2 and 10 minutes of −3 and −17 µC/m² respectively. The off-line fusing performance test was done to compare with Example 5. The hot offset release behavior passed at 182° C. FIG. 4 shows an SEM of a faced-off porous particle of this example which clearly shows the pigment in the pores as submicronic particles.

Example 7 (Invention)

Magnetic Particle in Pores

Porous particles containing magnetic particles in the pore were made as in Example 1 except that the amt of CMC solution used was 15 g. This was added to 12.5 g of the dispersion M1 and 14.7 g of water, and dispersed in 121.25 g of a 20% solution of Kao N in ethyl acetate. A 119 g aliquot of the resultant water-in-oil emulsion was added to 180 g of the pH 4 buffer containing 9.8 g of Nalco 1060, and homogenized. Prior to evaporation the emulsion was diluted by 50 wt % with water and isolated as before. The volume median particle size was 4.9 microns. The porous particles containing 10 wt % magnetic particles, were nonspherical, had a porosity of 44% and the fine magnetic particles were clearly visible in the pores upon microscopic analysis.

Example 8 (Invention)

Magnetic Particle in Pores

Porous particles with magnetic particles in the pore were made as in Example 7 except that no CMC solution was used and 26.25 g of the dispersion M1 was dispersed in 85.0 g of a 20% solution of Kao E in ethyl acetate. A 61 g aliquot of the resultant water-in-oil emulsion was added to 150 g of the pH 4 buffer containing 0.7 g of Ludox™, homogenized and isolated as before. The average particle size was 6.0 microns. The particles were nonspherical, porous with 30 wt % fine magnetic particles clearly visible in the pores upon microscopic analysis.

The invention has been described in detail with particular reference to certain preferred embodiments thereof, but it will be understood that variations and modifications can be effected within the spirit and scope of the invention.

The invention claimed is:

1. A porous particle comprising a polymer binder and at least one additive distinct from any pore stabilizing compound present in the porous particle, wherein:
the polymer binder comprises a solid compositionally continuous phase having an external particle surface;
discrete pores are dispersed within the solid compositionally continuous phase, forming internal pore surfaces; and
the at least one additive is present primarily in the discrete pores.

2. The porous particle of claim 1, wherein the at least one additive is not present in the solid compositionally continuous phase or on the external particle surface.

3. The porous particle of claim 1, wherein the at least one additive comprises at least one of a colorant, a release agent, a magnetic particle, a matting agent, or a biologically active agent.

4. The porous particle of claim 1, wherein the at least one additive comprises a colorant.

5. The porous particle of claim 4, wherein the colorant comprises a pigment.

6. The porous particle of claim 1, wherein the at least one additive comprises a wax.

7. The porous particle of claim 1, wherein the at least one additive comprises magnetic particles.

8. The porous particle of claim 1, further comprising a pore stabilizing hydrophilic colloid.

9. The porous particle of claim 1, wherein the porous particle has a porosity of at least 10 percent.

10. The porous particle of claim 1, wherein the porous particle is nonspherical.

11. A toner set for forming a color electrophotographic image comprising a plurality of different colored toners, where at least one of the plurality of different colored toners comprises porous particles according to claim 1.

12. The toner set according to claim 11, where at least two of the different colored toners comprise porous particles according to claim 1.

13. The toner set according to claim 12, wherein the at least two of the different colored toners each comprise different pigments present primarily in the discrete pores of the porous particles.

14. The toner set according to claim 13, wherein the at least two different colored toners comprise at least two of cyan, magenta, yellow, and black toners.

15. A method of making porous particles comprising a polymer binder and at least one additive, comprising:
providing a first aqueous phase comprising at least one additive;
dispersing the first aqueous phase in an organic solution containing a polymer binder to form a first emulsion;
dispersing the first emulsion in a second aqueous phase to form a second emulsion;
shearing the second emulsion in the presence of a particulate stabilizing agent to form droplets of the first emulsion in the second aqueous phase; and
evaporating the organic solution from the droplets to form porous polymer particles; wherein: the formed polymer porous particles comprise a solid compositionally continuous polymer binder phase having an external particle surface; discrete pores are dispersed within the solid compositionally continuous polymer binder phase, forming internal pore surfaces; and the at least one additive is distinct from any pore stabilizing compound present in the porous particle and is present primarily in the discrete pores.

16. The method of making porous particles according to claim 15, wherein the first aqueous phase further comprises a pore stabilizing hydrocolloid.

17. The method according to claim 15, wherein the at least one additive comprises at least one of a colorant, a release agent, a magnetic particle, or a matting agent.

18. The method according to claim 15, wherein the at least one additive comprises a colorant.

19. The method according to claim 15, wherein the at least one additive comprises a wax.

20. The method according to claim 15, wherein the porous particle has a porosity of at least 10 percent.

* * * * *